(12) United States Patent
Kato

(10) Patent No.: US 6,318,219 B1
(45) Date of Patent: Nov. 20, 2001

(54) CUTTING METHOD AND CUTTING FLUID

(75) Inventor: Yasuo Kato, Osaka (JP)

(73) Assignee: Taiyu Co., Ltd., Osaka (JP)

( * ) Notice: Subject to any disclaimer, the term of this patent is extended or adjusted under 35 U.S.C. 154(b) by 0 days.

(21) Appl. No.: 09/485,524

(22) PCT Filed: Jan. 16, 1998

(86) PCT No.: PCT/JP98/00162
§ 371 Date: Feb. 10, 2000
§ 102(e) Date: Feb. 10, 2000

(87) PCT Pub. No.: WO99/11426
PCT Pub. Date: Mar. 11, 1999

(30) Foreign Application Priority Data

Sep. 2, 1997 (JP) .................................................. 9-254167

(51) Int. Cl.[7] .............................. B23B 1/00; B23Q 11/00
(52) U.S. Cl. .................................. 82/1.11; 82/50; 82/901; 409/137; 408/56
(58) Field of Search ............................... 82/1.11, 50, 901; 407/11; 408/56; 409/135, 136, 137

(56) References Cited

U.S. PATENT DOCUMENTS

| Re. 33,124 | * | 12/1989 | Singer | 252/18 |
| 4,095,916 | * | 6/1978 | Hammond | 82/1.11 X |
| 4,776,969 | * | 10/1988 | Ryer et al. | 252/46.7 |
| 4,880,552 | * | 11/1989 | Guesnet et al. | 252/34 |
| 5,462,656 | * | 10/1995 | Staniec | 409/136 X |
| 5,464,549 | * | 11/1995 | Sieberth | 252/51.5 A |
| 5,466,380 | * | 11/1995 | Bratten | 409/137 |
| 5,547,592 | * | 8/1996 | Nakagawa et al. | 508/511 |
| 5,586,848 | * | 12/1996 | Suwijn | 82/901 X |
| 5,632,886 | * | 5/1997 | Staniec | 409/136 X |
| 5,652,201 | * | 7/1997 | Papay et al. | 508/228 |
| 5,800,104 | * | 9/1998 | Miyano | 409/137 |

* cited by examiner

Primary Examiner—Henry Tsai
(74) Attorney, Agent, or Firm—Vedder Price Kaufman & Kammholz

(57) ABSTRACT

A cutting method in which a solution is sprayed or jetted to a machining portion when machining by use of a water-insoluble cutting oil, wherein recovered liquid is collected and stored in one recovery tank, and separated into the water-insoluble cutting oil and another solution on the basis of the specific gravity difference, and are re-used. Stable machining is enabled by using the water-insoluble cutting oil, and measures against disaster are fully taken.

6 Claims, 4 Drawing Sheets

CUTTING METHOD AND CUTTING FLUID

TECHNICAL FIELD

The present invention relates to a cutting method in which the cutting precision is excellent and all possible disaster prevention measures are taken, and cutting oil used therein.

BACKGROUND ART

Cutting solutions are generally classified into water-soluble oil agents and water-insoluble oil agents, and they have the following characteristics, respectively.

First, a water-soluble oil agent has advantages whereby the processing precision can be increased since the cooling capability is excellent, and heating deterioration of tools can be prevented. Also, since the oil agent is used as a solution, it has an advantage whereby there is no danger of fire due to its non-flammability. However, since the agent is used as a solution diluted 10 to 50 times, in comparison with the water-insoluble oil agent, film strength is poor, and lubrication performance is also poor.

On the other hand, the water-insoluble oil agent has greater excellent effects as a cutting oil than the water-soluble oil agent whereby an excellent machined surface can be easily obtained due to excellent lubrication performance, and tools are not greatly worn. However, the water-insoluble oil agent is poorer in cooling capability and fire preventive performance than the water-soluble oil agent.

At a machining site, in accordance with an increase in rigidity of the machine, improvement in performance of tools, and improvement in machine controlling performance, the feeding speed can be increased, and the cutting area can be made larger. Therefore, the oil temperature easily rises as the cutting temperature rises, and in addition, the temperature at the cutting point also rises, whereby an ignition source area exceeding 500° C. increases. And, the stronger an impact added, the higher the possibility of sparking, and therefore, the danger of fire increases.

Also, when the processing machine is auto-operated, sometimes broken tools remain at the machined portion, and if the next processing is applied to this machined surface, tools are forcibly pressed against this surface, and may cause excessive heating resulting in a fire.

Therefore, generally, regarding disaster prevention as important, a water-soluble oil agent is mostly used, however, regarding roughness of the machined surface and machining stability as important, sometimes a water-insoluble oil agent is used, and in this case, a situation where the machine is damaged by fire and must be discarded, or personal injury (burns) is caused occurs.

In view of the current circumstances where machining works show a tendency toward labor saving and automation, it is extremely preferable that machining stability can be pursued without worrying about disaster prevention if possible. Herein, it can be considered that an emulsifier is added to the water-insoluble cutting oil to be in a water containing condition, however, the contained moisture immediately disappears and flammability revives in actuality. For example, when the oil is used for a lathe, a water content of 10% in the morning changes to less than 1% by evening. Also, when an emulsifier is added to the water-insoluble cutting oil, the lubrication performance as a water-insoluble cutting oil is lost due to an influence from the emulsifier.

The invention is made in view of the above problems, and the themes thereof are to enable stable machining by using a water-insoluble oil agent, and provide a machining method with sufficient measures taken against disaster, and a cutting oil to be used in machining.

DISCLOSURE OF INVENTION

In order to achieve the above themes, in claim 1 of the invention, a cutting method in which a solution is sprayed or jetted to the machining portion when machining by use of a water-insoluble cutting oil is provided, wherein recovered liquid is collected and stored in a recovery tank, based on the specific gravity difference, the water-insoluble cutting oil and other solutions are separated from each other, and are re-used. In the invention, for convenience, the words of cutting and solution are used, however, substantially, cutting includes grinding and other similar machining, and solution includes water (and so forth).

In the invention, when machining such as cutting and grinding, since a solution is sprayed or jetted to the machining portion, the cooling effect is excellent, and there is no danger of fire even if the water-insoluble cutting oil is used. Also, the machining precision can be increased due to a high cooling effect. Also, spraying of a solution is a concept including pouring of mist or a shower of the solution.

(A) Water-insoluble Cutting Oil of the Invention

The water-insoluble cutting oil generally means the first type cutting oil agent (Nos. 1 through 6) made from mineral oil and animal/botanical oil, or mineral oil and ester oil, and the second type cutting oil agent (Nos. 1 through 6, 11 through 17) in which an additive is added to the first type cutting oil agent, and if taking into account separativeness from a solution, an oil with a small acid value and a small content of saponified substance is preferable, and the acid value of the additive to be used is preferably 1 KOH mg/g or less.

Concretely, the oil is composed from a combination of proper amounts of highly refined mineral oil, chlorinated paraffin, and polysulfide. For the combination, only mineral oil need be used, or a liquid mixture of mineral oil and chlorinated paraffin, mineral oil and polysulfide, or mineral oil, chlorinated paraffin, and polysulfide can be used. If an oily effect is necessary, a slight amount of oils and fats whose acid value is 1 KOH mg/g or less can be added.

(B) Solution of the Invention

Also, generally, a solution of water-soluble cutting agent, a solution containing an anticorrosive, and a cleansing agent solution correspond to the solution of the invention, and an alkali liquid can be used even if it has little difference in anticorrosive performance, and moreover, it is preferable that the liquid has excellent separativeness from the water-insoluble cutting oil and hardly forms a middle layer. Specifically, ① a solution of 0.1 through 2% of triethanolamine, ② a solution diluted 30 times of a water-soluble cutting oil containing approximately 25 through 30% of triethanolamine, approximately 8 through 15% of a medium-chained fatty acid, and approximately 40 through 60% of water as the principal ingredients, and ③ a solution containing 0.5% or less of a surfactant (negative ionic, positive ionic, amphoteric ionic, or nonionic surfactant including soap) are applicable.

The water-insoluble oil agent and solution are collected in one recovery tank in a dispersed and mixed condition, and are separated based on the specific gravity difference. Since tools may be chipped due to massive moisture if the viscosity of the water-insoluble oil agent increases in accordance with the water content, in order to maintain the original characteristics of the oil agent, the water content rate must be set to at least 50%, or less, and preferably, 5% or less. Therefore, it is preferable that the recovery tank has a capacity enabling 5 minutes or more of collected liquid storing time.

As the operating environment of the invention, in a case of slight amounts of shavings, it is preferable that the water-insoluble oil agent and solution which are separated in the recovery tank from each other are stored in separate storing tanks, and then supplied to the cutting machine.

Claim 2 of the invention relates to a cutting method in which a water-insoluble cutting oil or water-soluble cutting oil is selectively used in accordance with machining, wherein the recovered liquid is collected and stored in one recovery tank, separated into water-insoluble cutting oil and water-soluble cutting oil on the basis of the specific gravity difference, and are re-used.

In the invention, since optimum cutting or grinding suitable for the object to be machined and machining condition can be performed, for example, when machining for which lubrication is regarded as important, the water-insoluble cutting oil may be used. In this case, since lubrication is sufficient, preferable cutting can be performed, and in addition to this effect, other effects can be obtained whereby rust and offensive smells are prevented. Also, in order to completely eliminate the danger of fire, the method of claim 1 can be used at the same time.

On the other hand, in a case where cooling performance must be regarded as important, or viscosity of oil after machining is not preferable, the water-soluble cutting oil may be used. In this case, advantages of the water-soluble cutting oil are provided such that there is no danger of fire, the machined object is not sticky, the machine is not contaminated by the oil, cooling performance is sufficient, and so on.

As the water-insoluble cutting oil and water-soluble cutting oil to be used, oils described in the above (A) and (B) are preferable.

Claim 3 of the invention relates to a cutting method in which a water-insoluble cutting oil is used in a water containing condition without using an emulsifier, wherein the water-insoluble cutting oil is a mineral oil or a liquid mixture containing chlorinated paraffin or polysulfide and mineral oil as the principal ingredient, and the water-insoluble cutting oil after being used is collected and maintained in a condition containing approximately 4% through 20% of water. According to the examination by the present inventor, it has been confirmed that, in a case of a water content of 4% or more, flammability can be suppressed, and in a case of a water content of 20% or less, characteristics of the water-insoluble cutting oil are not lost.

In order to use the water-insoluble cutting oil in a water containing condition, for example, a water-insoluble cutting oil and water are mixed together, and then separated from each other, whereby the obtained water-insoluble cutting oil can be used. However, in the invention, since a mineral oil or a liquid mixture of chlorinated paraffin or polysulfide and a mineral oil is used, the water content may become 4% or less for excellent separativeness from water. Therefore, in such a case, the inside of the storing tank is slowly stirred, or by using a slight amount of a surfactant, the water content of 4% or more can be maintained. Also, a countermeasure can be taken by watering on the periphery of the machining portion when cutting.

BACKGROUND OF THE INVENTION

FIGS. 1(a)–1(c) show the construction of the recovery tank for carrying out the invention.

BEST MODE FOR CARRYING OUT THE INVENTION

On the basis of the embodiments, the invention shall be further described in detail.

Figure 1A:
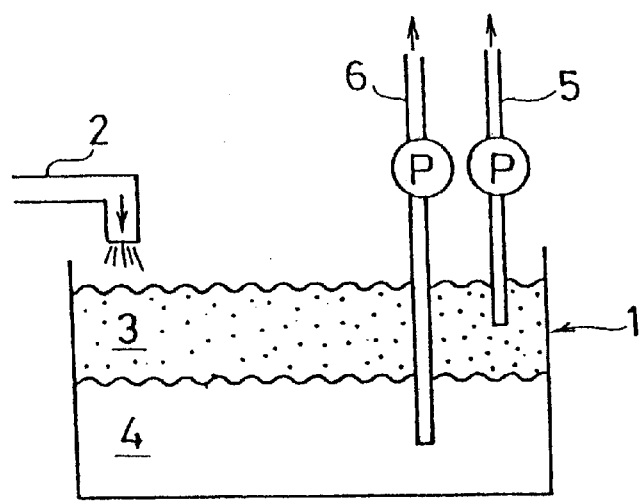

(a) through (c) in FIG. 1 show the structure of recovery tank 1 to be used for carrying out the invention.

From the processing machine side, through recovery pipe 2, water-insoluble cutting oil 3 and solution 4 (or water) are recovered, and in recovery tank 1, in accordance with their specific gravity, the water-insoluble cutting oil 3 is separated upward. Also, the expression of solution 4 means that it contains water, and is a solution containing an anticorrosive or a solution of a water-soluble cutting agent.

In the recovery tank 1, two suction parts 5 and 6 are provided, and suction part 5 suctions and supplies the water-insoluble cutting oil 3 separated upward to the processing machine. On the other hand, the suction part 6 suctions and supplies the solution 4 separated downward to the periphery of the machining portion. By this operation, since the periphery of the machining portion is cooled, the machining precision of the processing machine can be improved. Also, the solution 4 is supplied by being sprayed or jetted, however, if it is jetted like a shower and spreads over the periphery of the machining portion, accidental fires can be prevented without fail.

Figure 1B:
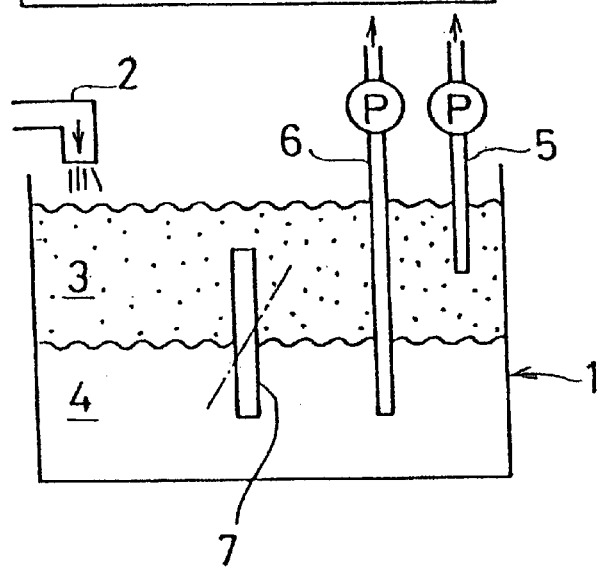

FIG. 1(b) shows an embodiment in which partition 7 of the vertical direction is provided at the center of the recovery tank 1 to make the liquids 3 and 4 inside still. Also, the liquids 3 and 4 in the recovery tank 1 are in contact with each other horizontally. The partition 7 can be provided vertically as shown in the figure, however, according to an experiment by the inventor, as shown by the imaginary lines, it is preferable that the partition is inclined. Also, the inclination angle is properly set in accordance with the viscosity of the cutting oil.

Figure 1C:
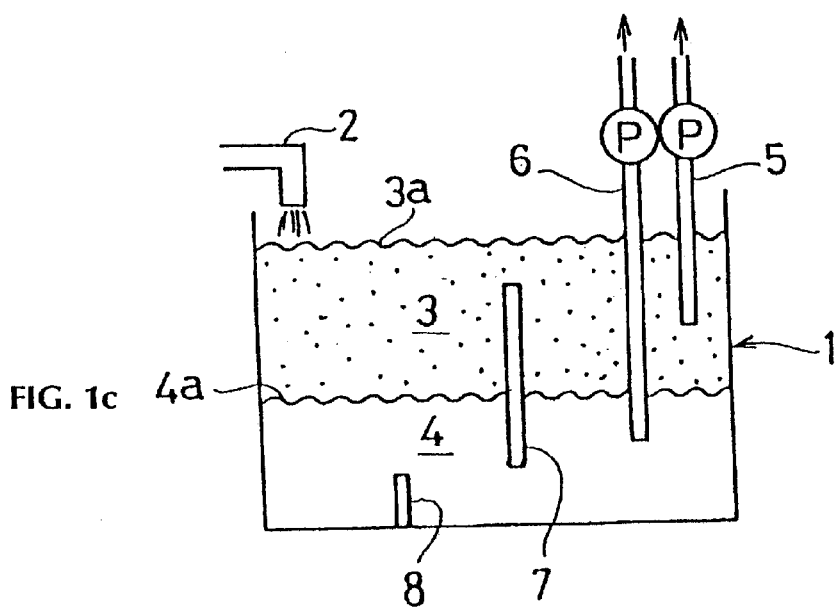

FIG. 1(c) shows an embodiment in which a block plate 8 is provided in accordance with the dropping point of the recovered liquids. In this case, since the block plate 8 blocks off the flow of the solution 4, the liquids 3 and 4 in the recovery tank can be made still without fail.

Although not shown in (a) through (c) of FIG. 1, the levels 3a and 4a of the solution 4 and water-insoluble cutting oil 3 are controlled, and the liquid decreased is supplied. Also, the level 4a of the solution 4 is detected by means of a float lighter than the solution 4 though heavier than the water-insoluble cutting oil 3.

The embodiments relating to claim 1 of the invention are described as in the above, and if a solution of a water-soluble cutting oil is used as the solution 4, the water-insoluble cutting oil 3 and water-soluble cutting oil 4 can be separated from each other in the recovery tank 1 shown in (a) through (c) of FIG. 1. Therefore, in accordance with the object to be machined, if either one of the two suction parts 5 and 6 is operated to selectively supply either the water-insoluble cutting oil or water-soluble cutting oil, the invention relating to claim 2 can be carried out.

Figure 2:
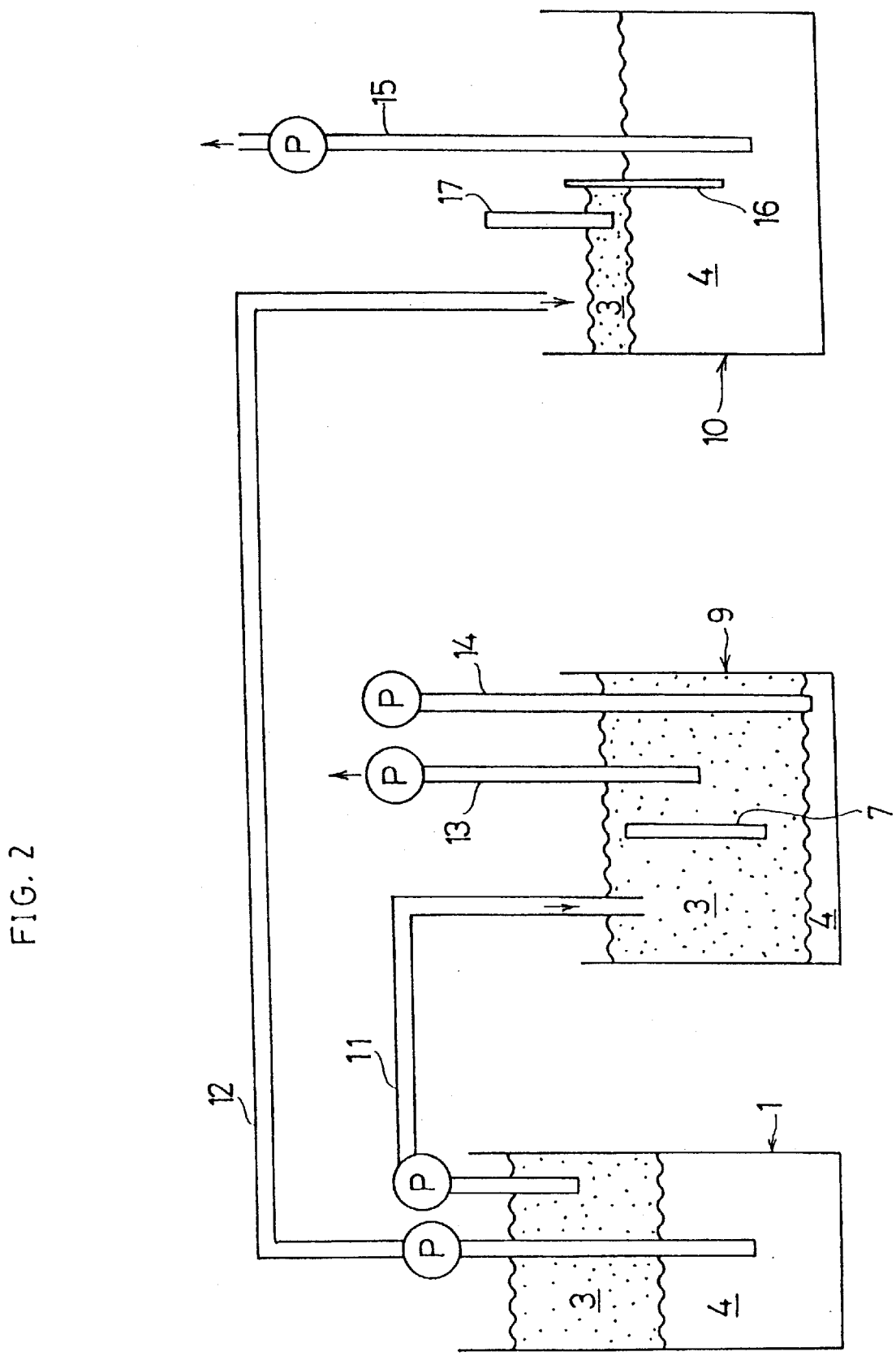
FIG. 2 shows the construction of the recovery tank, water tank, and oil tank.

FIG. 2 shows another embodiment of the invention, wherein oil tank 9 and water tank 10 are provided in addition to the recovery tank 1 of FIG. 1.

The water-insoluble cutting oil 3 separated upward in the recovery tank 1 is supplied to the oil tank 9 through first oil pipe 11, and the solution 4 separated downward in the recovery tank 1 is supplied to the water tank 10 through first water pipe 12.

The water-insoluble cutting oil 3 which is supplied from the first oil pipe 11 to the oil tank 9 is mixed with a slight amount of moisture, however, since the mixed moisture is precipitated slowly in the oil tank 9, only the water-insoluble cutting oil 3 is stored at the upper part in the oil tank 9. And, the separated water-insoluble cutting oil 3 is supplied to the processing machine through second oil pipe 13, and the solution 4 precipitated downward is supplied from the water tank 10 to the recovery tank 1 through second water pipe 14. Also, at nearly the center of the oil tank 9, partition 7 is provided vertically to realize stillness of the inside liquids.

In the solution 4 which is supplied from the first water pipe 12 to the water tank 10, a slight amount of oil is mixed. However, since the mixed oil is slowly separated in the water tank 10, in the water tank 10, only the solution 4 is stored except for the extreme upper part. And, the solution 4 in the water tank 10 is supplied to the processing machine through third water pipe 15. Also, at the upper part of the water tank 10, since an oil separating chamber is formed by the partition 16, and also, oil skimmer 17 is provided, unnecessary oil is skimmed without fail, and returned to the recovery tank 1 or oil tank 9.

In the embodiment of FIG. 2, since the oil tank 9 and water tank 10 are separately provided from the recovery tank 1, the water-insoluble cutting oil 3 and solution 5 can be increased in purity. And, when machining by use of the water-insoluble cutting oil 3, if the solution 4 from the water tank 10 is jetted or sprayed to the machining portion, the invention relating to claim 1 is realized. Also, in accordance with the object to be machined, if either one of the second oil pipe 13 or third water pipe 15 is communicated with the machine, the invention relating to claim 2 can be carried out. Furthermore, without operating the second water pipe 14, if the inside of the oil tank 9 is stirred, or a slight amount of a surfactant is added, the invention relating to claim 3 can be realized.

Figure 3:
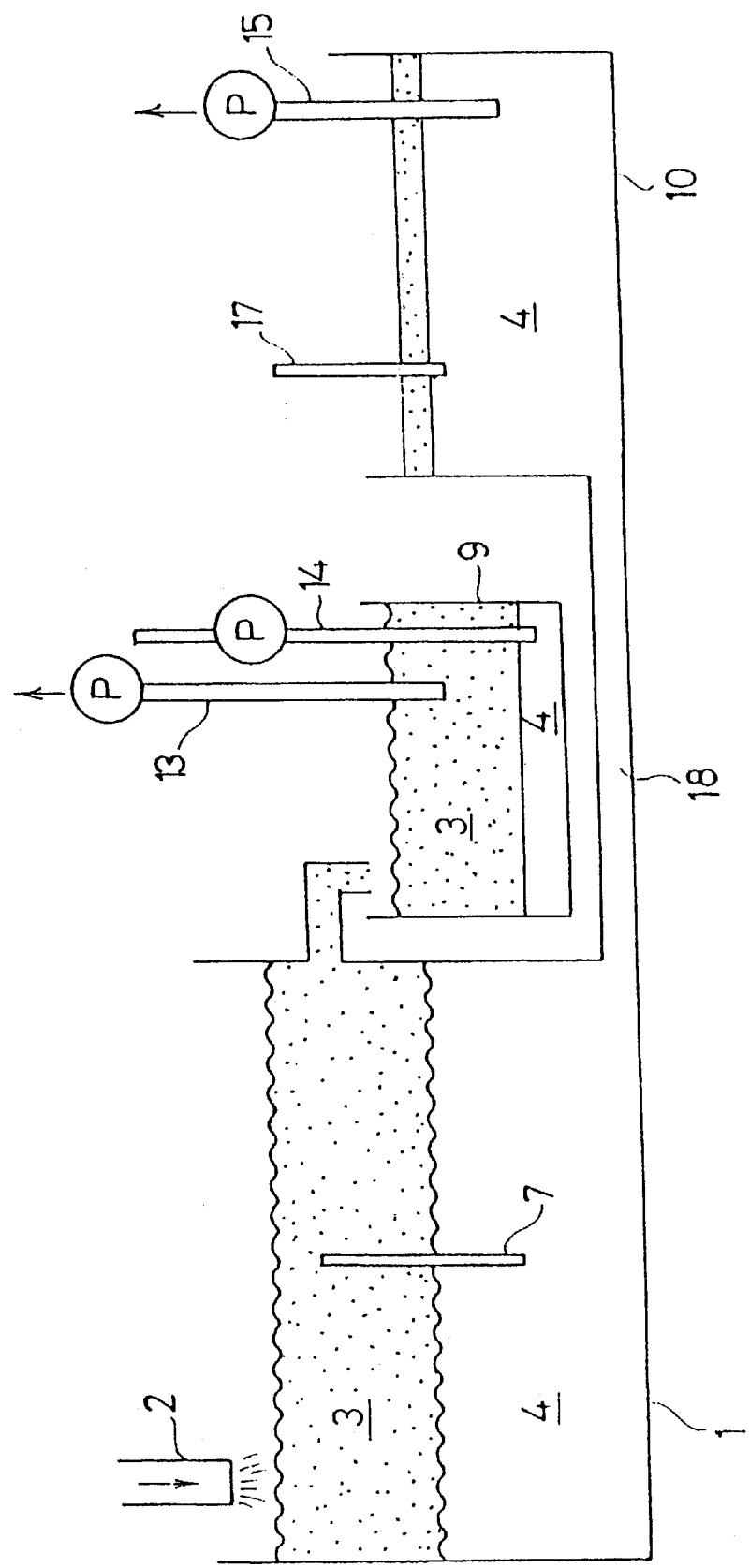
FIG. 3 shows the construction of the recovery tank, water tank, and oil tank.

FIG. 3 shows an embodiment in which the lower end parts of the recovery tank 1 and water tank 10 are communicated with each other via connection pipe 18, and the water-insoluble cutting oil 3 is supplied from the recovery tank i to the oil tank 9 due to a natural flow. Also, at the deepest part of the recovery tank 10, a filter is provided.

As clearly understood from a comparison with FIG. 2, since no pump is used for the liquid flow from the recovery tank 1 to the water tank 10 and the liquid flow from the recovery tank 1 to the oil tank 9, there is no liquid flow in the oil tank 9 and water tank 10, whereby the separating action is smoothly made. Also, the actions of the oil pipe 13, water pipe 14, water pipe 15, and oil skimmer 17 are the same as in the case of FIG. 2.

Figure 4:
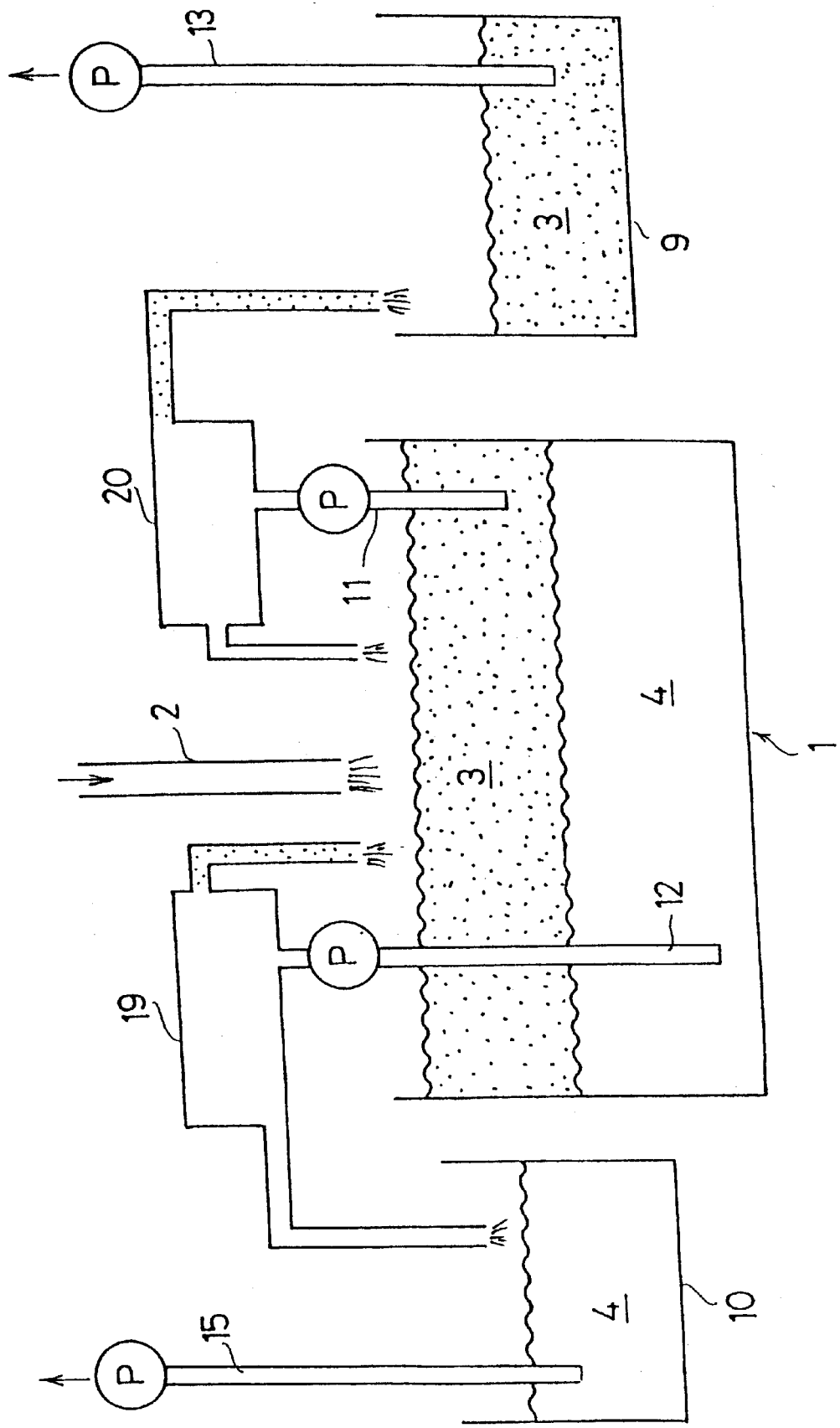
FIG. 4 shows the construction of the recovery tank, water tank, and oil tank.

FIG. 4 shows an embodiment in which centrifuges 19 and 20 are provided between the recovery tank 1 and water tank 10, and the recovery tank 1 and oil tank 9.

The solution 4 suctioned from the water pipe 12 is separated into a solution 4 with heavy specific gravity and cutting oil 3 with light specific gravity by the centrifuge 19, and the solution 4 is supplied to the water tank 10, while the cutting oil 3 is returned to the recovery tank 1. Likewise, the cutting oil 3 suctioned from the oil pipe 11 is separated into the solution 4 with heavy specific gravity and cutting oil 3 with light specific gravity by the centrifuge 20, and the cutting oil 3 is supplied to the oil tank 9, while the solution 4 is returned to the recovery tank 10.

In this embodiment case, since the centrifuges 19 and 20 are used, separation between the solution 4 and water-insoluble cutting oil 3 is performed without fail. Also, the actions of the oil pipe 13 and water pipe 15 are the same as in the case of FIG. 3.

According to the construction of FIG. 4, since a water-insoluble cutting oil 3 with high purity can be obtained, by adding a predetermined amount of water into the oil tank 9, the invention relating to claim 3 can be realized without fail. Although two centrifuges 19 and 20 are used in FIG. 4, one centrifuge can be used, whereby the solution 4 with heavy specific gravity is supplied to the water tank 10, and the cutting oil 3 with light specific gravity is supplied to the oil tank 9.

(a) Oil and Water Separation Test

① Samples 1 through 8 (water-soluble cutting oil) Samples 1 through 8 shown in Table 1 are prepared as water or water-soluble cutting liquids. Also, the diluting times of the water-soluble cutting liquid are as shown in the right column in Table 1.

In Table 1, the nonionic surfactant A means a surfactant having emulsifying action such as polyethoxynonylphenol, polyethoxyalkylether, and sorbitan monooleate.

The nonionic surfactant B is a compound expressed by $HO(CH_2CH_2O)_n(CH_3CH_2CH_2O)_m(CH_2CH_2O)_xH$, wherein m, n, and x are optional values exceeding zero. The nonionic surfactant C is a compound expressed by $HO(CH_3CH_2CH_2O)_n(CH_2CH_2O)_m(CH_3CH_2CH_2O)_xH$, wherein m, n, and x are optional values exceeding zero.

Medium-chained fatty acid indicates alkylcarboxylic acid of monoacid or dibasic acid of carbon-6 through carbon-11, and high fatty acid indicates alkyl- or allyl-carboxylic acid of monoacid or dibasic acid of carbon-12 through carbon-24.

PAG (polyalkylene glycol) is a random combination of ethylene oxide and propylene oxide, which is mono-, di-, or tri-hexanol depending on the number of OH-groups at the molecular end.

② Samples A through K (Water-insoluble Cutting Oil) Samples A through K whose compositions are shown in Table 2 are prepared as water-insoluble cutting liquids.

③ Test Method

Into a 100 cc graduated cylinder with a cock, 50 cc of water or water-soluble cutting liquid (Table 1) and 50 cc of water-insoluble cutting oil (Table 2) were poured. Next, the graduated cylinder was closed by the cock and strongly shaken up and down 50 times, and placed still, and after 5 minutes, the separating condition was inspected.

The results are shown in Table 3, wherein preferable separating conditions were confirmed in the combinations of samples A, G, J, and K and samples 1, 2, 6, 7, and 8. On the other hand, as for samples 3 and 5, it was confirmed that the separativeness from all water-insoluble cutting oils (samples A through K) was poor.

④ Preferable Water-insoluble Cutting Oil

From the above results, it is confirmed that the water-insoluble cutting oils which provide excellent effect by being applied with the invention are samples A, G, J, and K, and also, a cutting oil with a combination of highly refined mineral oil, chlorinated paraffin, and polysulfide is preferable.

⑤ Preferable Water-soluble Cutting Oil

As water-soluble cutting oil, it was confirmed that the solution of triethanolamine (sample 2) was excellent. Also, when the diluting time was changed, and confirmation was made, the same results were obtained even in the case of a solution of approximately 0.1 through 2%.

Also, from the composition of samples 6, 7, and 8, it is confirmed that a solution diluted 30 times of a water-soluble cutting oil containing approximately 20 through 30%, of triethanolamine, approximately 8 through 15% of medium-chained fatty acid, and 40 through 60% of water as the principal ingredients is preferable. Also, it can be considered that the same effects can be obtained if triethanolamine is 15% or more by weight, medium-chained fatty acid is 5% or more by weight, and water is 35% or more by weight.

Also, a surfactant having a lipophilic group of carbon-12 or more (negative ionic, positive ionic, amphoteric ionic, or nonionic surfactant including soap) can be used at a 0.5% or less content rate. The reasons for this are (1) the separativeness of the emulsion cutting liquid b (sample 4) is improved rather than the emulsion cutting liquid a (sample 3) from Table 3, (2) the contents of the nonionic surfactant A and high fatty acid in sample 4 are less in comparison with sample 3 from Table 1, and (3) the total contents of petroleum sulfonic acid soda, nonionic surfactant A, and high fatty acid are 14%, and 0.47% for use from sample 4.

(b) Flammability Test

In order to determine the relationship between the water content rate and flammability, a flammability test was conducted by means of a test method shown by JISK 2265 in which 1 through 10% of water was added to the water-insoluble cutting oil (sample L). As a result, flammability was shown at a water content rate of 3%, however, when oil with a water content rate of 4% or more was not ignited even if approaching a fire source. That is, the practical effect of claim 3 of the invention in which the water-insoluble cutting oil was used in a condition containing 4% or more of water was confirmed.

Sample L:
petroleum sulfonic acid soda: 5%
nonionic surfactant: 7%
high alcohol: 4%
chlorinated paraffin: 6%
polysulfide: 4%
mineral oil: 74%

(c) Water Content in the Water-insoluble Cutting Oil

In the separation test (a), after 5 minutes, 25 ml of oil (one-fourth part from the upper part of the whole amount) was skimmed from the upper oil surface, and the water content was measured in accordance with the JISK2275 distillation method.

In the separation test (a), predetermined separativeness could be confirmed in the combinations of samples A, G, J, K and samples 1, 2, 6, 7, and 8, however, in the case of a combination maintaining the condition containing 4% or more of water, the invention relating to claim 3 can be realized.

From Table 5, as combinations to be applied with the invention relating to claim 3, the sample A and samples 2, 6, and 8, sample G and samples 7 and 8, sample J and samples 2, 7, and 8, sample K and samples 2, 7, and 8 are confirmed as preferable.

Also, in the case of the combinations of samples A, J, and K and sample 1 (water), and sample A and sample 7, the water content rate becomes less than 4% due to excellent separativeness, however, since these contain a slight amount of water, ignition danger can be avoided by sprinkling water (having corrosion prevention) on the periphery of the machining portion.

INDUSTRIAL APPLICABILITY

According to the invention, without concerns about ignition, a water-insoluble cutting oil which is excellent in total performance as a cutting oil can be used.

TABLE 1

Composition of water-soluble liquid test samples (%)

| | | Water | Mineral oil | Petroleum sulfonic acid soda | Nonionic Surfactant A | Nonionic Surfactant B | Nonionic Surfactant C | Medium-chained fatty acid | High fatty acid | PAG | Tri-ethanol-amine | Mono-ethanol-amine | Diluting times |
|---|---|---|---|---|---|---|---|---|---|---|---|---|---|
| 1 | Water | 100 | | | | | | | | | | | — |
| 2 | Alkaline solution | | | | | | | | | | 100 | | ×200 |
| 3 | Emulsion cutting liquid a | | 77 | 8 | 6 | | | | 4 | | 3 | | ×30 |
| 4 | Emulsion cutting liquid b | | 86 | 10 | 3 | | | 1 | 1 | | 3 | | ×30 |
| 5 | Soluble cutting liquid | 59 | 5 | 8 | 2 | | | 1 | 15 | | 6 | 4 | ×30 |
| 6 | Cutting liquid (chemical solution) a | 61 | | | | | | 8 | | | 25 | 6 | ×30 |
| 7 | Cutting liquid (chemical solution) b | 50 | | | | 1 | | 10 | | 10 | 30 | | ×30 |
| 8 | Cutting liquid (chemical solution) c | 40 | | | | | 20 | 15 | | | 20 | 5 | ×30 |

TABLE 2

Composition of water-insoluble liquid test samples (%)

| Combined raw material | Sample oil No. | | | | | | | | | | |
|---|---|---|---|---|---|---|---|---|---|---|---|
| | A | B | C | D | E | F | G | H | I | J | K |
| Mineral oil | 100 | 90 | 85 | 75 | 70 | 60 | 85 | 90 | 90 | 90 | 90 |
| Chlorinated paraffin | | 2 | | | 5 | 20 | 5 | | | 10 | |
| Chlorinated methyl stearate | | | 8 | | | | | | | | |
| Sulfarized oil and fat | | | 8 | | 15 | 10 | | | 10 | | |
| Polysulfide | | | 2 | | | 5 | | | | | 10 |
| Lard oil | | | | 10 | 15 | 10 | | 10 | | | |
| Palm oil | | | 5 | | | | | 10 | | | |
| Epoxidated oil and fat | | | | | | 5 | | | | | |

TABLE 3

Separativeness after mixing water-insoluble cutting oil and water-soluble cutting oil

| Water-soluble liquid | | Sample oil No. | | | | | | | | | |
|---|---|---|---|---|---|---|---|---|---|---|---|
| | | A | B | C | D | E | F | G | H | I | J | K |
| 1 | Water | o | x | Δ | Δ | x | x | o | x | x | o | o |
| 2 | Alkaline solution | o | x | x | x | x | x | Δ | x | x | o | o |
| 3 | Emulsion cutting liquid a | x | x | x | x | x | x | x | x | x | x | x |
| 4 | Emulsion cutting liquid b | Δ | Δ | x | Δ | x | x | x | x | x | Δ | x |
| 5 | Soluble cutting liquid | x | x | x | x | x | x | x | x | x | x | x |
| 6 | Cutting liquid (chemical solution) a | o | x | x | x | x | Δ | Δ | Δ | x | Δ | Δ |
| 7 | Cutting liquid (chemical solution) b | o | Δ | Δ | Δ | Δ | o | o | Δ | Δ | o | o |
| 8 | Cutting liquid (chemical solution) c | o | Δ | Δ | Δ | Δ | o | o | Δ | Δ | o | o | o: Oil layer or water layer is 45 ml or more and middle layer is 10 ml or less
Δ: Oil layer or water layer is 40 ml or more and middle layer is 25 ml or less
x: Oil layer or water layer is less than 40 ml and middle layer is more than 25 ml

TABLE 4

Ignition point test

| Prescribed oil for test (sample L) % | 99 | 98 | 97 | 96 | 95 | 94 | 93 | 92 | 91 | 90 |
|---|---|---|---|---|---|---|---|---|---|---|
| Water adding amount % | 1 | 2 | 3 | 4 | 5 | 6 | 7 | 8 | 9 | 10 |
| Ignition point | 144 | 144 | 144 | | | No ignition point | | | | |

TABLE 5

Water content of water-insoluble cutting oil after mixing water-insoluble cutting oil and water-soluble cutting oil

| Water-soluble liquid | | Sample oil No. | | | | | | | | | |
|---|---|---|---|---|---|---|---|---|---|---|---|
| | | A | B | C | D | E | F | G | H | I | J | K |
| 1 | Water | 2 | — | — | 17 | — | — | — | — | 20 | 2 | 3 |
| 2 | Alkaline solution | 6 | — | — | 21 | — | — | — | — | 26 | 7 | 5 |
| 3 | Emulsion cutting liquid a | 22 | — | — | 24 | — | — | — | — | — | 18 | 24 |
| 4 | Emulsion cutting liquid b | 18 | — | — | 18 | — | — | — | — | — | — | 20 |
| 5 | Soluble cutting liquid | 40 | — | — | 28 | — | — | — | — | — | — | — |
| 6 | Cutting liquid (chemical solution) a | 7 | — | — | 25 | — | 12 | — | — | — | — | — |
| 7 | Cutting liquid (chemical solution) b | 3 | — | — | 14 | — | 8 | 5 | 13 | 12 | 5 | 6 |
| 8 | Cutting liquid (chemical solution) c | 2 | 13 | — | 12 | — | 7 | 7 | 10 | 13 | 3 | 4 |

— not measured

What is claimed is:

1. A cutting method, comprising the steps of:
   spraying or jetting a water solution on a periphery of a machining portion when machining with a water-insoluble cutting oil;
   recovering a liquid including a mixture of said water solution and said water-insoluble cutting oil after use of said liquid for machining;
   directing the liquid into a recovery tank for collection and storage;
   separating said water-insoluble cutting oil from said water solution on the basis of a difference in specific gravity; and,
   reusing said water solution and said water-insoluble cutting oil.

2. A cutting method, comprising the steps of:
   selectively using a water-insoluble cutting oil or a water-soluble cutting oil for machining;
   recovering a liquid including said water-insoluble cutting oil and said water-soluble cutting oil;
   directing said liquid into a recovery tank for storage;
   separating said liquid into said water-insoluble cutting oil and said water-soluble cutting oil on the basis of a difference in specific gravity; and,
   reusing said water-insoluble cutting oil and said water-soluble cutting oil.

3. A cutting method, comprising the steps of:
   using a water-insoluble cutting oil in a nonemulsified water solution for machining, where said water-insoluble cutting oil includes as a principal ingredient a mineral oil, or a liquid mixture containing chlorinated paraffin or polysulfide and a mineral oil;
   recovering said water-insoluble cutting oil after use; and,
   maintaining said recovered water-insoluble cutting oil in a condition containing 4–20% water.

4. The cutting method of claim 1, wherein said water-insoluble cutting oil includes as a principal ingredient a mineral oil, or a liquid mixture containing chlorinated paraffin or polysulfide and a mineral oil.

5. The cutting method of claim 2, wherein said water-insoluble cutting oil includes as a principal ingredient a mineral oil, or a liquid mixture containing chlorinated paraffin or polysulfide and a mineral oil.

6. The cutting method of claim 2, wherein said water-insoluble cutting oil includes as a principal ingredient a mineral oil, or a liquid mixture containing chlorinated paraffin or polysulfide and a mineral oil, and said water-soluble cutting oil includes as a principal ingredient either 100% water, a solution of 0.1–2% of triethanolamine, or a solution containing triethanolamine and a medium-chained fatty acid.

* * * * *